United States Patent [19]

Peterson

[11] 4,124,430
[45] Nov. 7, 1978

[54] ELECTRONIC SEALING APPARATUS
[75] Inventor: Everett A. Peterson, Roslyn Heights, N.Y.
[73] Assignee: Peterson Electronic Die Co., Inc., Mineola, N.Y.
[21] Appl. No.: 728,046
[22] Filed: Sep. 30, 1976

Related U.S. Application Data
[63] Continuation of Ser. No. 700,853, Jun. 29, 1976, Pat. No. 4,016,025.

[51] Int. Cl.² .......................... B32B 19/02; H05B 9/04
[52] U.S. Cl. .................................. 156/380; 219/10.81
[58] Field of Search ....................... 156/380, 273, 272; 219/10.81, 10.53, 10.41, 10.43

[56] References Cited
U.S. PATENT DOCUMENTS

| | | | |
|---|---|---|---|
| 2,625,969 | 1/1953 | Mann | 156/380 |
| 2,649,876 | 8/1953 | Thompson et al. | 156/380 |
| 2,649,877 | 8/1953 | Renn | 156/380 |
| 3,147,170 | 9/1964 | Frenkel et al. | 156/380 |
| 3,706,620 | 12/1972 | Dyksta | 156/380 |

Primary Examiner—Douglas J. Drummond
Attorney, Agent, or Firm—Lewis H. Eslinger

[57] ABSTRACT

An apparatus for use in sealing layers of thermoplastic material together from one side of the layers includes a heat sealing electrode having a first conductive element mounted on a support and adapted to be connected to a source of high frequency energy, and a second conductive element mounted on the same support but in spaced general parallel relation to the first conductive element and adapted to be connected to an electrical ground. The conductive elements are electrically insulated from each other and, when they are applied to one side of the thermoplastic sheet material to be sealed and high frequency energy is supplied to the first electrode, a seal is formed in the material beneath and between the ends of the electrode elements.

7 Claims, 13 Drawing Figures

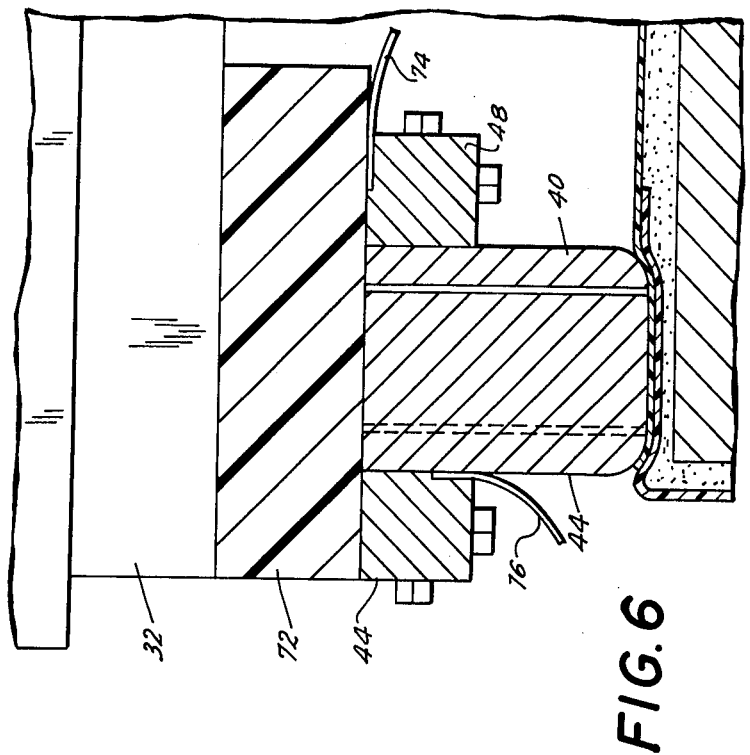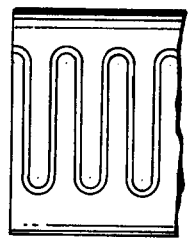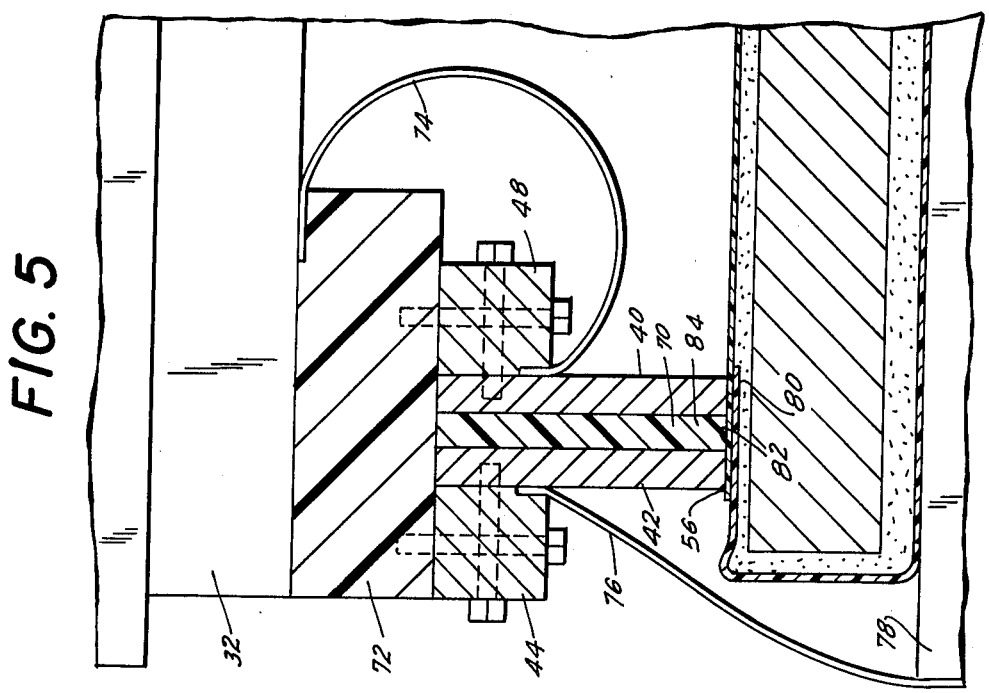

ELECTRONIC SEALING APPARATUS

This is continuation of application Ser. No. 700,853 filed June 29, 1976, now U.S. Pat. No. 4,016,025.

The present invention relates to an apparatus for sealing thermoplastic sheets of material together, and in particular to an apparatus and electrode for sealing layers of thermoplastic material together from one side of the layers only.

In the heat sealing art thermoplastic sheets of material have been used in the past to cover relatively thin dimension reinforcing stock, such as cardboard or chip board or the like to form looseleaf ring binders and other types of book backs. As disclosed in U.S. Pat. Nos. 3,215,450 and 3,277,505, coverings are applied to these materials by placing two sheets of thermoplastic material on opposite sides of an internal reinforcing member and applying two electrodes, one connected to a source of high or radio frequency energy and one to ground, on opposite sides of the layers of material to be welded together. The materials used for covering the reinforcing member being thermoplastic in nature adhere to each other at the location of the electrodes due to high or radio frequency welding, as is known in the art.

While the method of welding disclosed in these two patents has been found to be extremely efficient and satisfactory in use, it has not been possible heretofore to seal thermoplastic materials together on a relatively thick backing member because the backing member acts as an insulator and prevents the transmission of the high or radio frequency energy from the "hot" electrode to the ground electrode. Thus it has not been possible to use high frequency energy welding to secure thermoplastic materials together on such items as chair seats, stools, or the like which have a relatively thick inner reinforcing or support member. The usual procedure in those cases is to manually place a first layer of plastic material on the reinforcing member and then staple the marginal edges of the material over on the back of the reinforcing member. This requires a high degree of skill for the operator, and is relatively time consuming.

Accordingly, it is an object of the present invention to provide an apparatus and/or electrode which is adapted to seal layers of thermoplastic material from one side thereof.

Another object of the present invention is to provide a novel electrode for heat sealing layers of thermoplastic material together.

A still further object of the present invention is to provide a relatively simply constructed electrode for heat sealing thermoplastic materials together.

Yet another object of the present invention is to provide a simply constructed and durable apparatus for heat sealing thermoplastic materials together over a relatively thick backing member.

In accordance with an aspect of the present invention an apparatus for use in sealing layers of thermoplastic material, from one side of the layers over a relatively thick layer of insulating material, includes means for supporting a first layer of thermoplastic material beneath a layer of insulating material with a marginal portion of the thermoplastic material extending beyond the layer of the insulating material. Means are provided for turning this marginal edge of the first layer of thermoplastic material over a marginal edge portion of the layer of insulating or backing material in position to be sealed to a second layer of theromplastic material placed thereover after the turning operation.

The seal is formed by an electrode which includes first and second spaced generally parallely arranged conductive elements, one of which is adapted to be connected to a source of high frequency energy and the other of which is adapted to be connected to ground. The conductive elements are mounted on a support and electrically insulated from each other so that when high frequency energy is applied to one of the electrodes an energy field is created across the ends of the electrodes engaging the thermoplastic material in order to create the desired seal or weld in the thermoplastic layers, without interference from the thick insulating backing layer positioned therebelow.

The above, and other objects, features and advantages of this invention will be apparent in the following detailed description of an illustrative embodiment thereof, which is to be read in connection with the accompanying drawings, wherein:

FIG. 5 is a sectional view similar to FIG. 3 of a further embodiment of the present invention;

FIG. 6 is a sectional view similar to FIG. 3 of a still further embodiment of the present invention, adapted to make relatively wide seals;

FIG. 6A is a bottom view of the electrode shown in FIG. 6;

Figure 1:
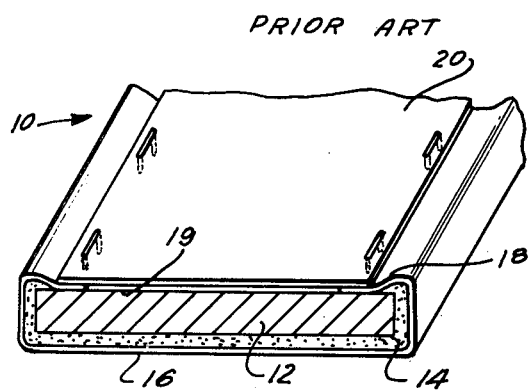
FIG. 1 is a partial perspective view, with parts broken away, of an inverted conventionally formed vinyl plastic covered seat.

FIG. 1 illustrates a prior art method for covering a seat 10 used on chairs or stools. These seats normally consist of a heavy wood or composition stiffening board 12 over which a layer of foamed cushioning material 14 is placed. This assembly is then covered with an external skin or layer 16 of plastic material, such as vinyl or the like, which has its marginal edges 18 turned over the bottom 19 of board 12. In many cases this marginal edge is simply stapled directly in place, into the board 12; but this creates an unaesthetic bottom for the seat. Therefore it is often the practice for the manufacturer to cover this bottom portion of the seat with another light board or paper layer 20 that is stapled on top of the unsightly turned over edges 18 of the cover layer 16. All of this requires a substantial amount of manual skill on the part of the operator and is extremely time consuming. Moreover, the end product is not entirely aesthetically pleasing.

Figure 2:
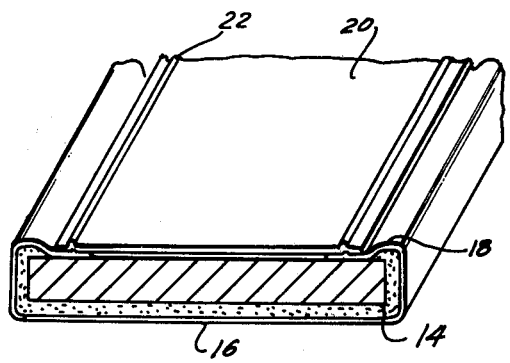
FIG. 2 is a perspective view similar to FIG. 1, but of a cushion constructed by use of the apparatus of the present invention.

In accordance with the present invention a similar seat cushion is formed by "heat" sealing the marginal edges 18 of the turned over outer skin of vinyl 16, as seen in FIG. 2. By the present invention these edges are heat sealed to the second cover layer 20 along a seal line 22, in order to complete the covering for the seat.

As mentioned, sealing of layers of theromplastic sheet material on a backing material such as cardboard or the like has been known for making products such as book covers. Such operations are dependent upon the "hot" electrode or die being in relatively close proximity to the support bed which is connected to ground, in order to allow the desired electric field to be created between these two elements. The greatest distance between the face of the "hot" electrode and the ground bed that can effectively seal two layers of vinyl is known to be approximately 0.125 inches, and even this cannot be done through a good insulator material. Thus prior art devices which have been used for making book covers or the like in which a relatively thin chip board or backing is covered, would not be suitable for use with relatively thick backing elements formed of wood, such as would be used in seats, since the wood is a good insulator which would prevent the creation of the field necessary to form the heat seal.

By the present invention the seal is made on the thermoplastic materials from one side of the cushion without the need for the field to pass through the entire assembly.

Figure 3:
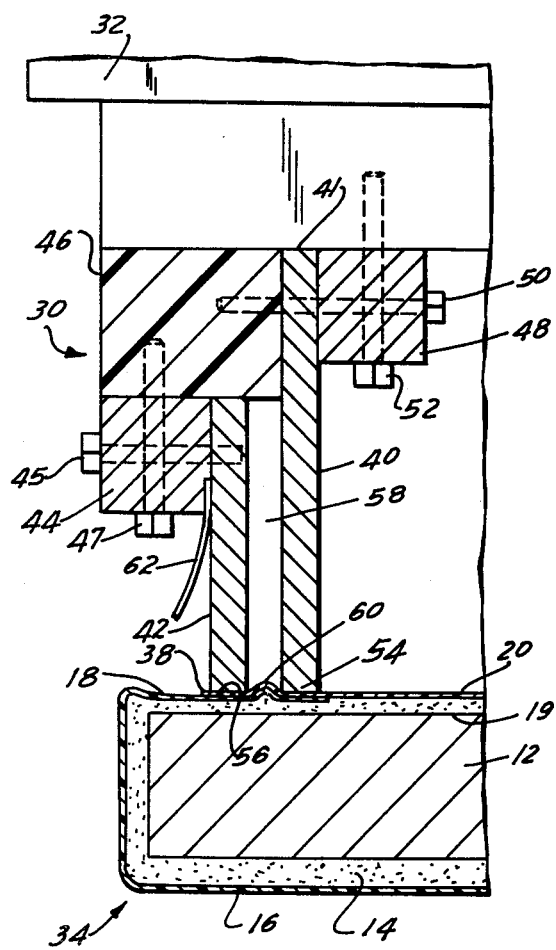
FIG. 3 is an elevational view, in section, of an electrode constructed in accordance with the present invention showing the electrode in a sealing position to form the seal for the cushion of FIG. 2.

In accordance with the invention a novel die element 30 is provided for use in sealing sheets of thermoplastic material together. As seen in FIG. 3 electrode 30 is mounted on the reciprocal sealing head 32 of a heat sealing press machine. Head 32 is reciprocally mounted in the machine in any convenient manner, as is conventional in heat sealing operations.

As described hereinafter a seat assembly 34 is positioned beneath sealing head 32 and consists of a central reinforcing board 12 of relatively great thickness, covered by a layer of foam material 14 and an outer layer 16 of thermoplastic material whose marginal edges 18 have been turned over the bottom side 19 of board 12. A second layer of thermoplastic material 20 is placed over marginal edges 18 of first layer 16 to cover bottom 19 of board 12. The marginal edges 18 of thermoplastic layer 16, and the marginal edge 38 of layer 20 are sealed together by the electrode 30.

Electrode 30 consists of a first electrically conductive element (typically formed of brass) 40 which is electrical contact at its inner end 41 with the die head 32. The latter is in turn connected to a source of high frequency or radio energy of the well known type used in forming seals in thermoplastic material.

A second electrode element 42 is also mounted on head 32. This electrode element is mounted on a lug or bar 44 by bolts 45. The bar 44 is in turn secured to an electrically insulative block 46 by separate bolts 47. Electrode element 40 is mounted to an elongated lug or bar 48, by elongated transverse bolts 50 which extend through electrode element 42 into the insulator bar 46. Finally lug 48 mounts the entire assembly on head 32 by means of one or more bolts 52. In this manner electrode elements 40, 42 are held in spaced generally parallel relation to each other, but they are electrically insulated from each other. The electrode elements are dimensioned and positioned so that their bottom ends or exposed free end portions 54, 46 respectively, in this embodiment of the invention, lie in substantially the same plane with an air space 58 remaining therebetween in adjacent but slightly spaced, relation to each other.

When the seal is to be formed on the theromplastic layers 16, 20 head 32 is lowered to engage the lower ends 54, 56 of the electrode elements with theromplastic layer 22 along its marginal edge 38. The pressure of the head on the thermoplastic material causes the material to buckle or bow slightly, as at 60. so that it enters into air space 58. The application of high frequency energy to the electrode element 40 creates a field across air space 58 to the electrode element 42 which is connected by a strap 62 or the like to an electrical ground. The field passing between the electrode elements passes through fold 60 and creates a seal between the layers according to known principles.

By this arrangement and mounting of the electrode elements the spacing between the elements can be carefully controlled and established, simply by properly dimensioning insulator block 46. Thus fine milling or machining of the electrodes to obtain accurate spacing is not necessary. This is as opposed to previously proposed sealing methods wherein the "hot" electrode must be finely milled at its lower surface to insure accurate spacing between it and the baseplate which supports the work to be sealed.

Figure 4:
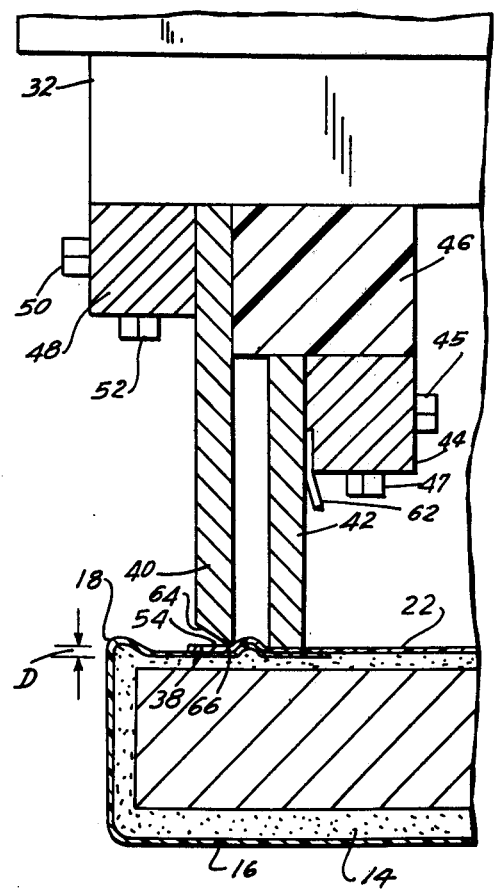
FIG. 4 is a sectional view similar to FIG. 3 of another embodiment of the invention.
Figure 7:
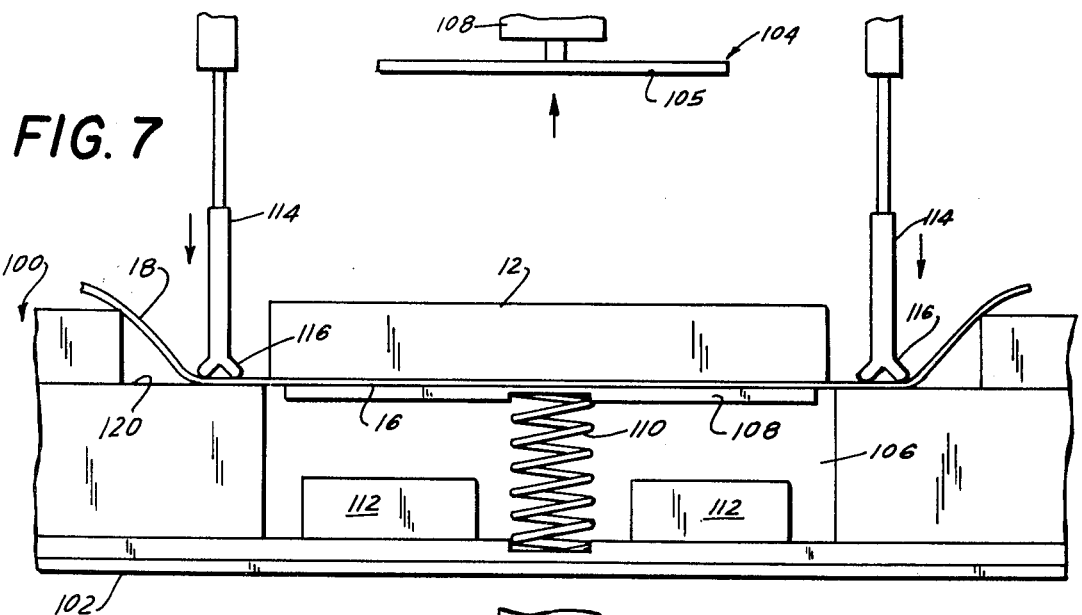
FIG. 7 is a schematic elevational view of an apparatus constructed in accordance with the present invention for use in covering members of the type illustrated in FIG. 2, and showing the initial phases of its operation.

FIG. 4 illustrates another embodiment of the invention which is similar in construction to the embodiment of FIG. 3. Corresponding elements in each of the figures are identified by the same reference numerals. In this embodiment of the invention the respective portions of the electrode elements has been reversed and element 40 is dimensioned to be slightly longer than the electrode element 42, so that the electrode element 40 in this embodiment extends beyond the lower end 56 of electrode element 42. This difference, identified by the reference D in FIG. 4, is selected to be equal to approximately the thickness of the material of the upper layer 22 being sealed.

In this embodiment lower end 54 of electrode element 40 is inclined or tapered as at 64 to form a straight edge 66 along its length. When the electrode is lowered onto the work piece, the upper layer of thermoplastic material 32 being sealed will be formed with a groove in it complementary to the inclined portion 62 of the electrode element 40. This forms a "tear" seal which will allow the edge portion of upper layer 22, outwardly of the seal, to be torn from the seal leaving only the central portion thereof welded to marginal portion 18 of layer 16. This is done in order to conserve on plastic utilized in the entire process, and to provide a neater seal appearance on the bottom of the seat.

Another embodiment of the invention is illustrated in FIG. 5 of the drawing. In this form, the two electrode elements 40, 42 are laminated or adhered, in any convenient manner, to an intermediate insulator layer 70 formed of an electrically insulative material such as polytetrafluoroethylene. The electrodes are secured to lugs 44, 48, as in the prior embodiment, which in turn are secured to an insulator layer 72 mounted on the die plate 32 of the press. Electrode element 40 is connected by a wire lead 74 to the plate 32 which, as mentioned above, is in turn connected to a source of high frequency or radio energy in the conventional manner. Ground electrode 42, on the other hand, is connected by a lead 76 to the bed 78 of the press, which in turn is connected to ground. In this embodiment of the invention, by placing insulator layer 72 between electrode elements 40, 42, the field 80 (indicated schematically by dotted lines in the drawing) created between the electrodes passes only across the bottom edges 54, 56 of the electrode elements beneath the insulator. Thus when the ends 54, 46 of the electrode elements and the end 82 of the insulator are pressed against the thermoplastic sheets, that material is held flat and field 80 passes through the sheets in order to form the weld. This will form a somewhat more narrow seal than the seal of the previously described embodiments.

As an alternative, insulator layer 82 can be relieved or recessed, as indicated by the dotted line 84 in the drawing, to permit the theromplastic material being sealed to extrude up into the space defined by the recess during the sealing cycle in order to form a small bead along the length of the seal. Where the flat electrode end 82 is used, a flat neat seal will be formed, but it is believed that somewhat more power will be required to form a seal with this arrangement than with the embodiments of the invention wherein an air space is left between the two electrode elements.

FIGS. 6 and 6A illustrate a still further embodiment of the invention which is adapted to form a wider seal on the layers of thermoplastic material, when a wider seal is necessary. In this embodiment of the invention two electrode elements 40, 42 are provided. However rather than being flat straight elements, each has a plurality of fingers 40', 42' which are positioned to interdigitate with each other, as illustrated in FIG. 6A. The fingers and electrodes are slightly spaced from one another to define a sinuous air space 90 therebetween. This space can either remain open to the air, or can be filled with a layer of insulator material, as in the embodiment of FIG. 5.

These electrode elements are respectively secured to the lugs 44, 48 which in turn are secured to an insulator plate 72. The electrodes element 40 is connected by a strap 74 to the source of RF energy, while element 42 is connected by strap 76 to electrical ground. By this arrangement a much wider and stronger seal will be formed.

FIGS. 7-12 of the drawings illustrate schematically an apparatus for sealing thermoplastic material over a thick intermediate board or the like, using electrodes of the type described above. The apparatus is somewhat similar to applicant's prior apparatus shown in U.S. Pat. No. 3,277,505.

In this apparatus a movable tray 100 is provided which is adapted to be positioned on a frame 102 or the like in the machine below a press head 104. Tray 100 includes a recess 106 in which a support platform 108 is located. The platform is biased upwardly by a spring 110 and a pair of stop blocks 112 are mounted in the base of the tray for limiting downward movement of platform 108. Press head 104 includes a pair of clamp elements 114 which may constitute pneumatic or hydraulic cylinders or the like having clamp feet 116 secured to the ends of their actuator rods 118.

Initially cylinders 114 are retracted so that the clamping feet 116 are away from tray 100. In that position a first layer 16 of thermoplastic material is positioned on platform 108 so that its marginal edges 18 extend beyond the platform. A board, or stay material, 12 is then placed on the platform above the layer of thermoplastic material 16. With the board properly positioned clamping feet 116 are lowered to engage the marginal edges 18 of thermoplastic sheets 16 and hold them in a relatively fixed position on the upper surface 120 of tray 100. Head 104 is then operated to lower a pressure plate 105, by operation of the hydraulic ram 108. Lowering of the pressure plate 105 will ultimately cause the plate to engage board 12 (see FIG. 8) and urge it downwardly against the bias of spring 110 to the lowermost position of the board in tray 100 as defined by the stop blocks 112.

Tray 100 includes a plurality of clamping members 130 slidably mounted on its upper surface 120. These clamping members are similar to the clamping members shown in applicant's above mentioned U.S. Pat. No. 3,277,505. The clamping members 130 are oscillated by hydraulic or pneumatic cylinders or the like (not shown).

Figure 8:
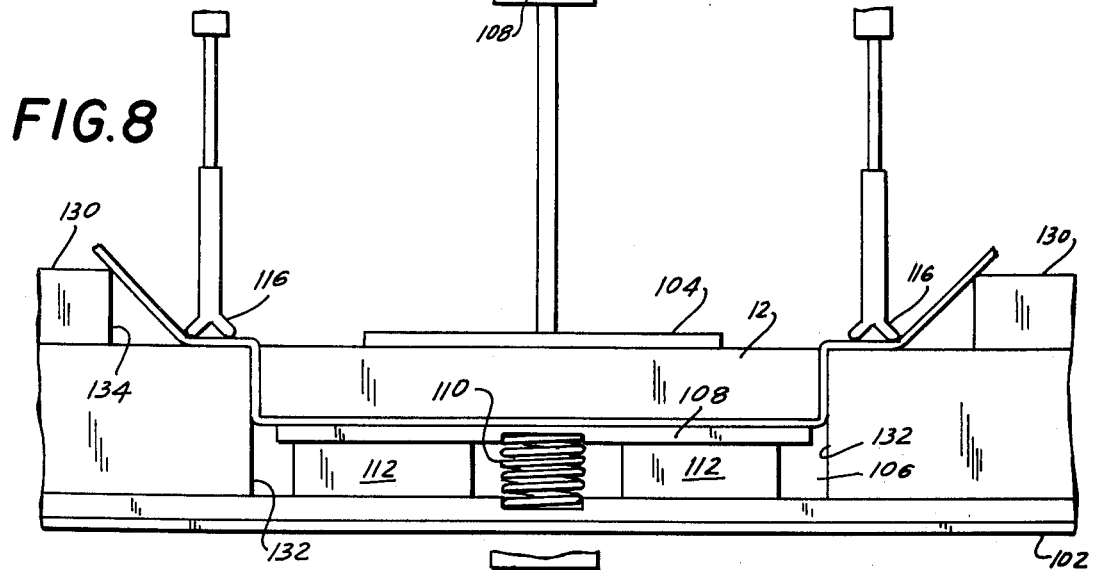
FIG. 8 is a side elevational view similar to FIG. 7 showing the step of turning the marginal edges of the thermoplastic material over the reinforcing board or stay.
Figure 9:
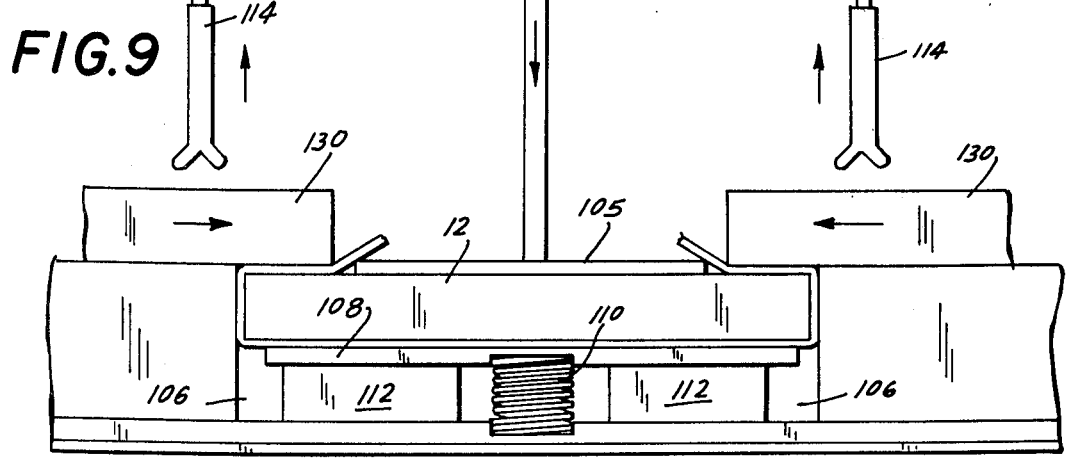
FIG. 9 is a side view similar to FIG. 8 showing the next step in the operation of turning the marginal edges of the first layer of thermoplastic material over the marginal edge of the back of the thick reinforcing member.
Figure 10:
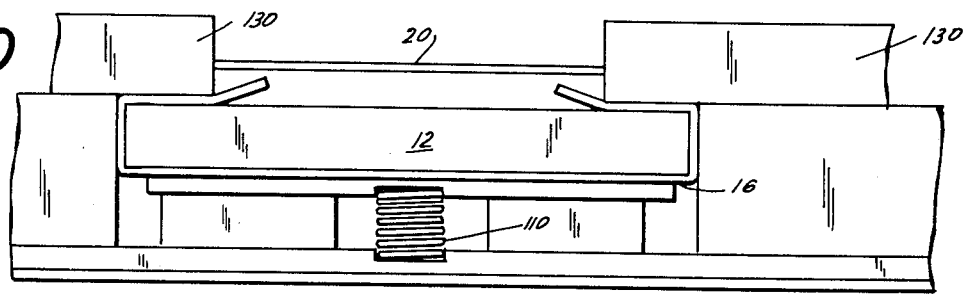
FIG. 10 is a side view similar to FIG. 9 showing the placement of the second layer of thermoplastic material on the turned over edges of the first layer.
Figure 11:
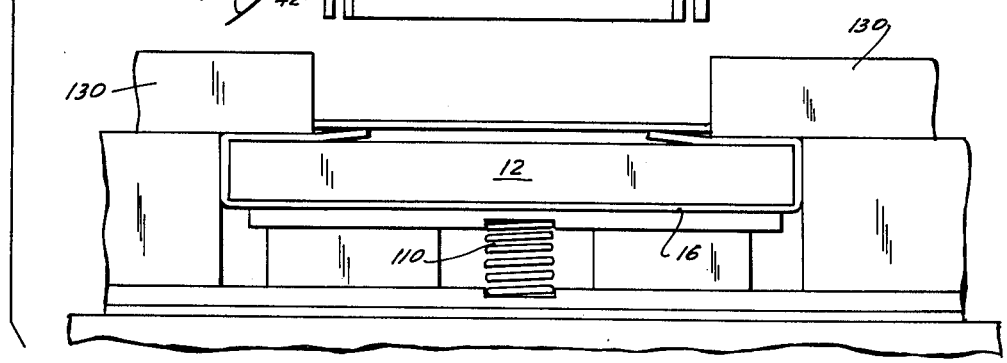
FIG. 11 is a side elevational view similar to FIG. 10 showing the positioning of the sealing electrode above the turned layers of thermoplastic material.
Figure 12:
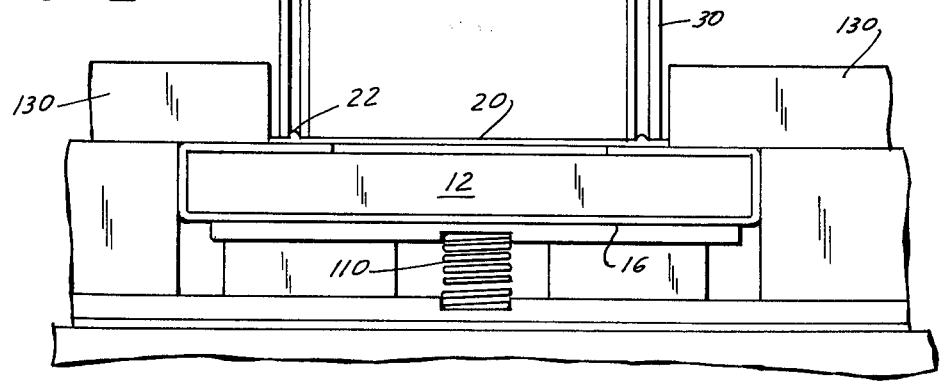
FIG. 12 is a view similar to FIG. 10 showing the sealing operation.

When pressure plate 105 has been completely lowered, the marginal portion 18 of the thermoplastic sheet 16 is trapped between the edges of the board 12 and the inner surface 132 of the well 106 in the tray 100, while the extreme ends of the sheet overlie the leading ends 134 of the clamp plates 130 (see FIG. 9). With the marginal edges 18 of sheet 16 held in this position clamp feet 116 are raised and clamp plates 130 are operated to move inwardly over the board or stay 12, thereby to turn the marginal edges of the sheet 16 over the bottom of the board 12. When their innermost position, illustrated in FIG. 8, is achieved movement of plates 130 stops, with their ends 134, overlying the board 12, to hold the board in its depressed position so that the pressure plate 105 can be removed.

With plate 105 raised by ram 108 away from tray 100, the tray can now be moved from this station in the machine to the sealing station. This tray can be moved manually or the press can be provided with any convenient moving mechanism for sliding or shifting the tray from one portion of the frame of the apparatus to another portion of the frame and the station at which sealing is performed.

At the sealing station (see FIG. 10) the second or backup sheet 20 of thermoplastic material 40 is placed on the back of board 12 over the extreme ends of marginal edges 18 of sheet 16, with tray 100 positioned beneath the press head of the apparatus. This head has an aluminum die plate 32 secured thereto to which radio frequency energy is applied. That plate is connected by the strap 74 to the "hot" electrode element 40 of the electrode 40, while the other electrode element 42 is connected by a ground strap 46 to electrical ground. The electrode, it will be understood, has a peripheral configuration conforming to the desired peripheral configuration of the seal being formed between the sheets of thermoplastic material. In the illustrative embodiment of the invention the electrode has a generally square configuration when viewed in plan.

When the seal is to be made tray 100, with depressed board 12 thereon held in place by the clamping elements 130, is slid into proper aligned position beneath the electrode 30. The head 32 of the press is then lowered by actuation of a hydraulic cylinder or the like, to cause the lower ends of the electrode to engage the overlying marginal edges of the thermoplastic sheets in order to form the seal. After a predetermined time has elapsed the seal is formed and the press head is raised away from the work piece. The slide clamping plates 130 are then retracted (either manually or hydrualically) and the work piece or seat can be removed from tray 100. Platform 108 raises under the influence of spring 110 to its original position and the tray is ready for reuse.

It is contemplated that the entire operation to cover the backing element 12 with thermoplastic material in this manner may take as little as 15 seconds, as opposed to at least a minute of time required to cover a seat cushion by conventional stapling methods described above:

By the apparatus of the present invention the thickness of the reinforcing board or stay 12 immaterial to the formation of the seal between the thermoplastic layers. The limitation imposed by prior art devices used in heat sealing, that the high frequency field had to pass through the material and the reinforcing stay is overcome by the present invention which provides the ability to seal two mating surfaces of vinyl from one side thereof. It is contemplated that the electrode can be made portable in use, so that seals can be made on vinyl shingles or the like while on the roof of a building, since there is no need to have a high frequency electrode opposed by a ground potential bed in order to form the seal.

Preferably, the space between the electrode elements 40, 42 of the present invention is about one-sixteenth inch in order to form a proper seal.

It can be seen that a substantial amount of time and expense is saved by the apparatus of the present invention while at the same time the apparatus produces a neat and aesthetically pleasing seal on the thermoplastic material.

Although illustrative embodiments of the present invention have been described herein with reference to the accompanying drawings, it is to be understood that the invention is not limited to those precise embodiments, but that various changes and modifications may be effected therein by one skilled in the art without departing from the scope or spirit of this invention.

What is claimed is:

1. An electrode for use in sealing layers of thermoplastic material together from one side of the layers, said electrode comprising, a support, a first conductive element mounted on said support and adapted to be connected to a source of high frequency energy, a second conductive element mounted on said support in spaced relation to said first conductive element and adapted to be connected to an electrical ground; means for electrically insulating said first and second elements from each other; and a solid layer of insulating material located between said first and second elements; said first and second conductive elements each having exposed free end portions located in adjacent, but slightly spaced, relation to each other.

2. An electrode as defined in claim 1 wherein said free ends of said elements are flat and lie in substantially the same plane.

3. An electrode for use in sealing layers of thermoplastic material together from one side of the layers, said electrode comprising, a support, a first conductive element mounted on said support and adapted to be connected to a source of high frequency energy, a second conductive element mounted on said support in spaced relation to said first conductive element and adapted to be connected to an electrical ground; and means for electrically insulating said first and second elements from each other; said free end of said first element extending slightly beyond the free end of said second element and being inclined towards said second element to form a tear seal in the material being sealed.

4. An electrode as defined in claim 1 wherein said layer of insulating material has a free end and the free ends of said elements and said layer of insulating material all lie in the same plane.

5. An electrode as defined in claim 1, wherein the free ends of said elements lie in substantially the same plane and said layer of insulating material has a free end located slightly inwardly of said plane between said elements.

6. An electrode as defined in claim 5, wherein said first and second elements have interdigitating segments located in spaced generally parallel relation to each other to form a relatively wide seal.

7. An electrode as defined in claim 6 including a layer of insulating material positioned between said elements and the interdigitating segments thereof.

* * * * *